United States Patent
Leggett, III et al.

(10) Patent No.: US 9,567,846 B2
(45) Date of Patent: Feb. 14, 2017

(54) DEVICES AND METHODS FOR DOWNHOLE ACOUSTIC IMAGING

(71) Applicants: James V. Leggett, III, Magnolia, TX (US); Roger R. Steinsiek, Houston, TX (US); Wei Han, Sugar Land, TX (US); Kamalesh Chatterjee, Spring, TX (US)

(72) Inventors: James V. Leggett, III, Magnolia, TX (US); Roger R. Steinsiek, Houston, TX (US); Wei Han, Sugar Land, TX (US); Kamalesh Chatterjee, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/587,251

(22) Filed: Dec. 31, 2014

(65) Prior Publication Data

US 2015/0204993 A1    Jul. 23, 2015

Related U.S. Application Data (60) Provisional application No. 61/925,361, filed on Jan. 9, 2014.

(51) Int. Cl.
*G01V 1/40* (2006.01)
*E21B 47/01* (2012.01)
(Continued)

(52) U.S. Cl.
CPC ............. *E21B 47/01* (2013.01); *B06B 1/0207* (2013.01); *E21B 47/101* (2013.01); *B06B 2201/70* (2013.01); *G01V 1/40* (2013.01)

(58) Field of Classification Search
CPC .......... G01V 1/40; E21B 47/01; E21B 47/101; B06B 1/0207; B06B 2201/70
See application file for complete search history.

(56) References Cited

U.S. PATENT DOCUMENTS 4,733,380 A * 3/1988 Havira ................ E21B 47/0002
181/105
5,067,114 A * 11/1991 Rorden ................... E21B 47/12
340/855.3
(Continued)

FOREIGN PATENT DOCUMENTS

EP        0070139 B1      3/1986

OTHER PUBLICATIONS

Zhang, Application of ultrasonic phased array in acoustic logging, 17th World Conference on Nondestructive Testing, Oct. 25-28, 2008, Shanghai, China, pp. 1-6.*
(Continued)

*Primary Examiner* — Luke Ratcliffe
*Assistant Examiner* — Hovhannes Baghdasaryan
(74) *Attorney, Agent, or Firm* — Cantor Colburn LLP (57) ABSTRACT

An acoustic transducer assembly includes: a carrier configured to be disposed in an earth formation, the carrier having a carrier axis; an array of transducer elements forming at least a semicircular shape, the array configured to emit acoustic signals in a radial direction relative to the carrier axis; and a circuit coupled to the array and configured to actuate a subset of the transducer elements and emit an acoustic beam therefrom, the circuit configured to actuate the subsets as a phased array to electronically rotate the acoustic beam about the carrier axis.

20 Claims, 7 Drawing Sheets

(51) Int. Cl.
*E21B 47/10* (2012.01)
*B06B 1/02* (2006.01)

(56) References Cited

U.S. PATENT DOCUMENTS

| | | | | | |
|---|---|---|---|---|---|
| 5,146,050 | A | * | 9/1992 | Strozeski | G01V 1/52 181/102 |
| 5,164,548 | A | * | 11/1992 | Angehrn | E21B 47/0002 181/103 |
| 5,454,267 | A | * | 10/1995 | Moreau | G01N 29/221 73/622 |
| 5,676,213 | A | * | 10/1997 | Auzerais | B08B 3/12 166/177.2 |
| 7,293,461 | B1 | * | 11/2007 | Girndt | G01N 29/04 310/336 |
| 7,698,937 | B2 | * | 4/2010 | Neidhardt | E21B 47/08 73/152.57 |
| 2003/0008780 | A1 | * | 1/2003 | Chowdhary | C08B 37/0096 507/209 |
| 2006/0185430 | A1 | * | 8/2006 | Yogeswaren | B06B 1/0622 73/152.16 |
| 2007/0084277 | A1 | * | 4/2007 | Steinsiek | E21B 47/101 73/152.18 |
| 2009/0183941 | A1 | * | 7/2009 | Pabon | G01V 1/523 181/102 |
| 2011/0149684 | A1 | * | 6/2011 | Hurst | G01V 1/46 367/34 |
| 2011/0163891 | A1 | * | 7/2011 | Wilson | H04B 10/2504 340/854.9 |
| 2011/0192222 | A1 | * | 8/2011 | Vetter | E21B 47/0005 73/152.58 |
| 2011/0203375 | A1 | * | 8/2011 | Farthing | G01N 29/07 73/628 |

OTHER PUBLICATIONS

Notification of Transmittal of the International Search Report and the Written Opinion of the International Searching Authority, or the Declaration; PCT/US2015/010624; Mailed Apr. 22, 2015, 14 pages.

Schwarz, et al., "Development of a New Ultrasonic Circular Array for Endoscopic Application in Medicine and NDT", 1988 Ultrasonics Symposium, Oct. 2-5, 1988, pp. 639-642.

Vos, et al., "An Ultrasonic Circular Array Transducer for Pipeline and Borehole Inspection", 1988 Ultrasonics Symposioum, Oct. 1988, pp. 659-662.

* cited by examiner

Visualization of the ultrasonic lens.

DEVICES AND METHODS FOR DOWNHOLE ACOUSTIC IMAGING

CROSS REFERENCE

This application claims the benefit of an earlier filing date of U.S. Provisional Application Ser. No. 61/925,361 filed Jan. 9, 2014, the entire disclosure of which is incorporated herein by reference.

BACKGROUND

Acoustic imaging includes a variety of techniques that are used in the energy industry to measure or estimate characteristics of earth formations. For example, ultrasonic imaging tools can be deployed in a borehole and used to obtain information regarding formation characteristics such as lithology and fracture configurations. Such tools can also be used to determine casing conditions. Downhole conditions require that imaging tool components be able to operate effectively in high temperature conditions. Tool characteristics such as material properties and complexity can limit the conditions in which such tools are effective and/or can limit the useful life of such tools.

SUMMARY

An acoustic transducer assembly includes: a carrier configured to be disposed in an earth formation, the carrier having a carrier axis; an array of transducer elements forming at least a semicircular shape, the array configured to emit acoustic signals in a radial direction relative to the carrier axis; and a circuit coupled to the array and configured to actuate a subset of the transducer elements and emit an acoustic beam therefrom, the circuit configured to actuate the subsets as a phased array to electronically rotate the acoustic beam about the carrier axis.

A method of imaging at least one of a borehole and an earth formation includes: deploying a carrier in a borehole in an earth formation, the carrier having a carrier axis, the carrier including an array of transducer elements forming at least a semicircular shape, the array configured to emit acoustic signals in a radial direction relative to the carrier axis; actuating a subset of the transducer elements by a circuit coupled to the array and emitting an acoustic beam therefrom, the circuit configured to actuate the subsets as a phased array to electronically rotate the acoustic beam about the carrier axis; detecting acoustic signals from at least one of the borehole and the earth formation by an acoustic receiver; and estimating characteristics of at least one of the borehole and the earth formation based on the detected signals.

A method of generating an acoustic signal from an acoustic transducer includes: actuating a transducer by applying a pulsed signal, the pulsed signal being generated using pulse-width modulation and having a duty cycle selected based on harmonic content produced by the transducer.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
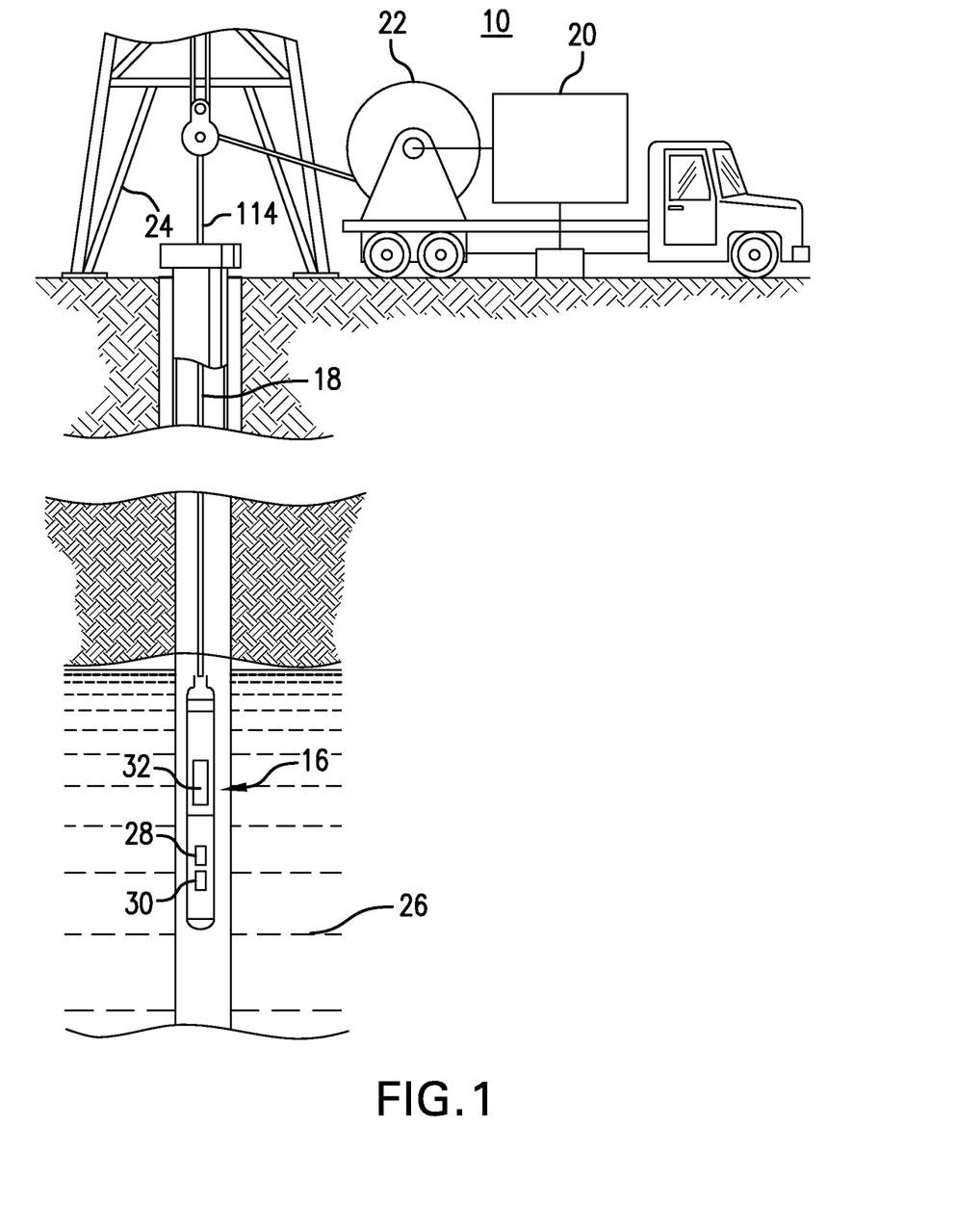
FIG. 1 depicts an embodiment of a system for evaluating or measuring a formation.

FIG. 1 illustrates aspects of an exemplary embodiment of a system 10 for performing energy industry operations such as formation measurement and/or evaluation, hydrocarbon production, completion and stimulation. The system 10 includes a borehole string 12 such as a pipe string, coiled tubing, wireline or other carrier disposed within a borehole 14 that is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

In the example shown in FIG. 1, the system 10 is configured as a well logging system that includes a logging assembly or tool 16 that is disposed in the borehole 14 via a wireline 18. A Surface deployment system includes a surface control unit 20 for controlling a winch 22 or other deployment device that lowers the wireline 18 from a rig 24, platform, wellhead and/or other surface structure. The system 10 may include various other components for facilitating a measurement operation, and/or for facilitating other energy operations. For example, the system 10 may include a pumping device in fluid communication with a fluid tank or other fluid source for circulating fluid through the borehole 14. The system 10 may also include a drilling assembly. Measurement operations can thus be performed in conjunction with various energy industry operations, such as drilling operations, stimulation operations (e.g., hydraulic fracturing and steam lift), completion operations and production operations.

The tool 16 may be configured as a data acquisition tool that is a part of a measurement and/or monitoring system. The data acquisition tool 16 is disposed in the borehole 14 and advanced to an area or location of interest within a formation 26. The data acquisition tool 16 is configured to emit measurement signals into the formation 26 to estimate characteristics thereof. The borehole 14 may be a vertical borehole as shown in FIG. 1, but is not so limited. The borehole or portions thereof can be vertical, deviated, horizontal and can have any selected path through a formation.

In one embodiment, the tool 16 and/or the system 10 is configured for acoustic imaging of the formation 26 and/or other area of interest. The tool 16 includes one or more acoustic monopole and/or multipole transmitters 28 that emit ultrasonic and/or other acoustic energy pulses (also referred to as "measurement signals" or "acoustic signals"). One or more acoustic receivers 30 are disposed at the tool 16 for receiving echo signals from the formation 26. In one embodiment, the receiver 30 and the transmitter 28 are incorporated as an acoustic transducer or transducer array. In one embodiment, the tool 16 is configured for ultrasonic imaging of the borehole and/or formation. For example, features of the formation can be evaluated by imaging formation fractures. The casing can be evaluated by imaging the casing after it is in the borehole and before and/or after cementing.

The data acquisition tool 16 is configured to monitor and/or collect data related to formation characteristics. The tool 16 may be deployed downhole via any suitable carrier and may be configured to operate in conjunction with other downhole or surface tools. In one embodiment, the tool 16 and/or other downhole components are in communication with one or more processing units or devices, such as a downhole electronics unit 32 and/or a surface processor such as the control unit 20. The processing devices are configured to perform various functions including receiving, storing, transmitting and/or processing data from the tool 16. The processing devices include any number of suitable components, such as processors, memory, communication devices and power sources. Communication can be achieved via any suitable configuration, such as acoustic, electrical or optical communication, wireless communication and mud pulse telemetry.

Figure 2:
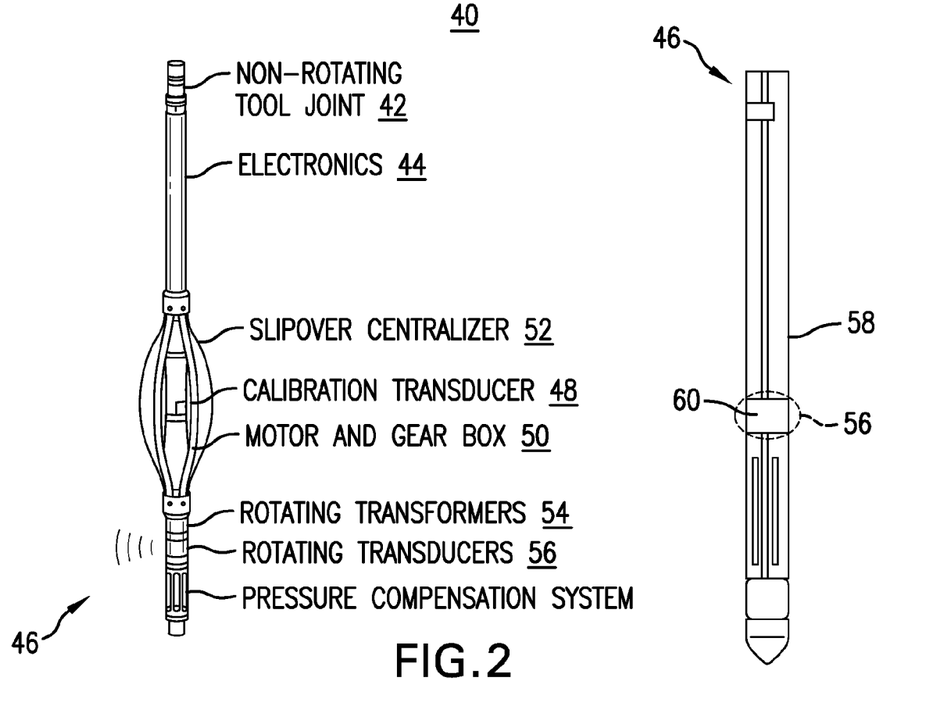
FIG. 2 depicts portions of an acoustic imaging tool.
Figure 3:
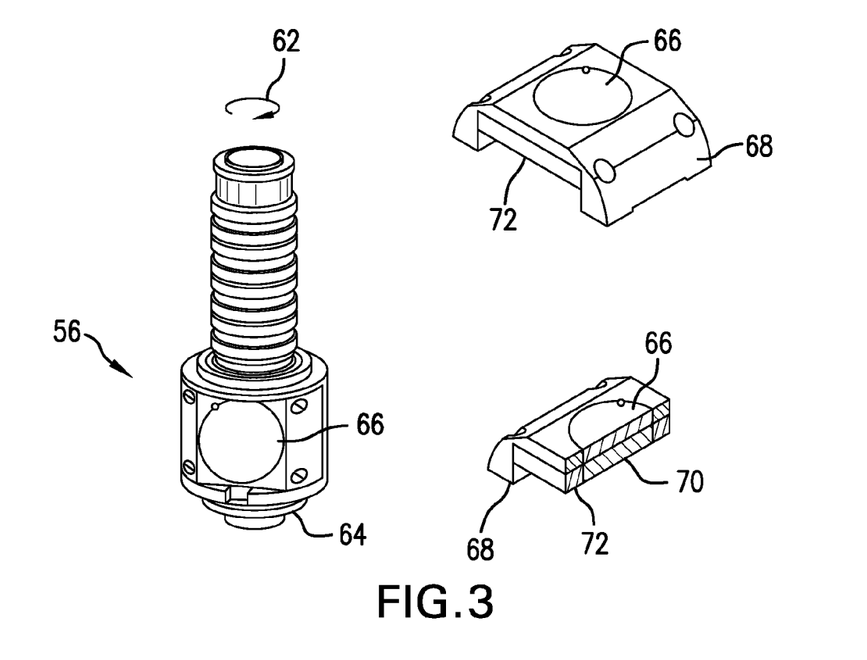
FIG. 3 depicts embodiments of a rotating acoustic transducer assembly.
Figure 4:
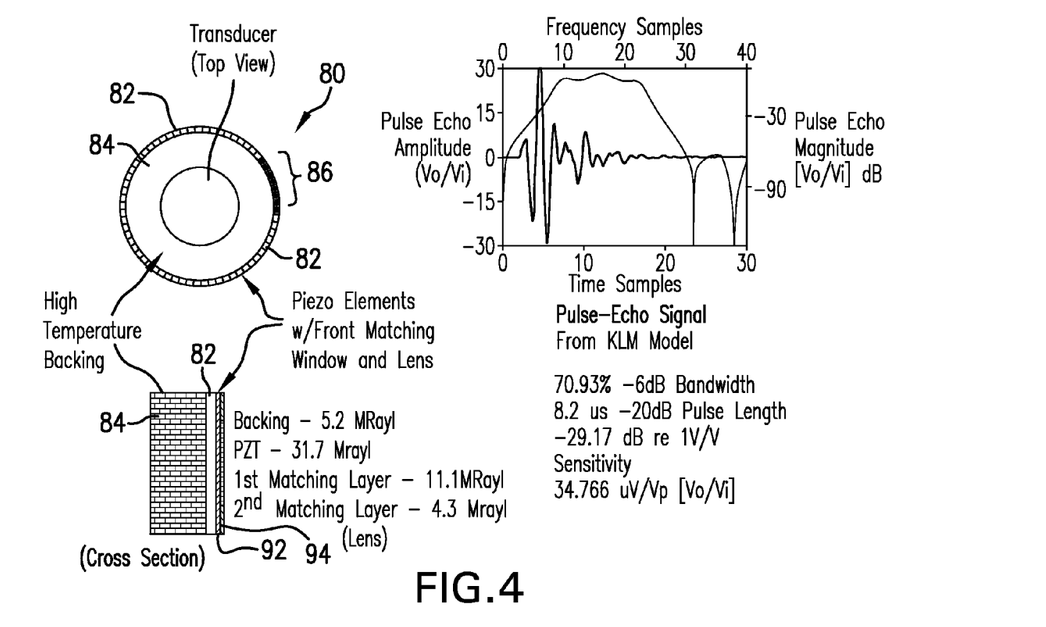
FIG. 4 depicts an embodiment of an acoustic transducer assembly including an actuator element array.
Figure 5:
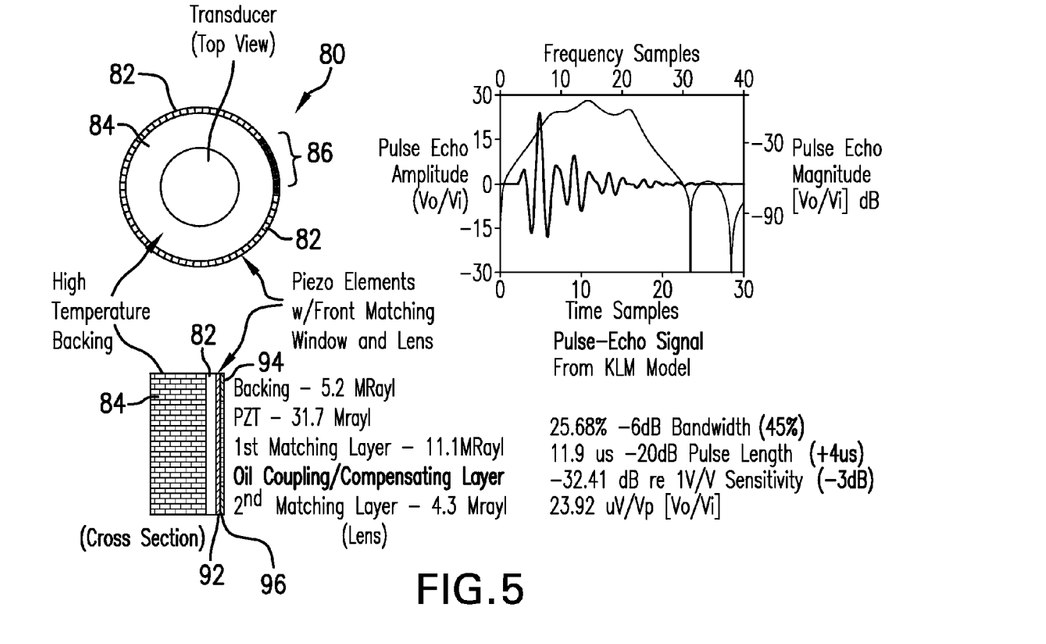
FIG. 5 depicts an embodiment of an acoustic transducer assembly including an actuator element array.

FIGS. 2 and 3 show an embodiment of an acoustic imaging tool 40 that includes one or more acoustic transducers and is configured for downhole deployment and measurement. The tool 40 is incorporated in a bore string and includes a tool joint 42 for connecting the tool 40 to other components of the string (e.g., a wireline, pipe segment or another measurement tool), an electronics module 44 and a transducer module 46. The tool 40 may include additional components, such as a calibration transducer 48, a motor and gear box 50 for rotating a transducer, and a centralizer 52.

The transducer module 46 includes a rotating transformer 54 coupled to a rotating transducer assembly 56. The transformer is disposed in a transformer section 58 of the tool and is connected to the transducer 56, which is disposed behind a window 60. The transformer 54 is provided for communicating signals from the transducer and the magnetometer to the non-rotating part of the tool.

The window 60 is made of a suitable material through which acoustic signals can be transmitted. An exemplary material is polytetrafluoroethylene, which is sold under the trade name Teflon®, although any material with a desired abrasion resistance and acoustic properties may be utilized. The window is cylindrical in this example to allow the transducer to fully rotate, but is not so limited, and can be any size and shape suitable for allowing transmission of acoustic signals while protecting the transducer from environmental effects (e.g., pressure). In one embodiment, the space between the front side of the transducer 56 and the window 60 is filled with a suitable material, such as oil.

An embodiment of the transducer assembly 56 is shown in FIG. 3. The transducer assembly 56 is connected to a rotating platform 62 that includes secondary windings of the transformer 54 and a magnetometer 64 to make measurements of the orientation of the platform and the transducer.

The transducer assembly 56 includes a piezoelectric transducer 66 configured as a disc shaped piezoelectric element, which is mounted in a frame 68 or other support structure. An acoustic attenuator, referred to as a backing 70, is disposed in contact with the transducer element on the back side opposite from the side of the element in the direction at which acoustic signals are to be emitted. The backing 70 is configured to attenuate acoustic signals propagating away from the desired transmission direction and to reduce reflections from the interface between the transducer 66 and backing 70. The backing 70 is held in contact with the transducer 66 by any suitable mechanism, such as an epoxy 72 or an adhesive. The transducer 66 is coupled to an electrical circuit to energize the transducer 66 to transmit acoustic signals at a selected frequency.

In use, the measurement tool images a borehole, casing or formation by axially moving the tool 40 at a selected speed while the transducer is rotated at a selected rotational rate, resulting in a helical scan of the borehole. A number of scans are performed per revolution (e.g., 360 samples per revolution, or one sample per degree), and these scans are combined as a scan line. An image is built up over time using multiple scan lines generated as the tool is rotated.

The image can be analyzed to evaluate formation characteristics, such as identifying and characterizing natural and/or stimulated fractures (e.g., estimating strike, dip and apparent aperture). Thus information is useful in evaluating formations, performing fracturing operations and monitoring or evaluating other subterranean operations such as geothermal energy production.

The transducer and transducer assemblies are not limited to the specific configurations described herein, as the transducer can be shaped and positioned in any manner to allow for transmission of acoustic signals. For example, the transducer can be mounted on an extendable arm or member to extend the transducer into the borehole annulus and/or contact the borehole wall. The extendable member may include a transducer to perform acoustic measurements from various locations in the annulus (e.g., at one or more different radial distances from the tool or borehole string) and/or in direct contact with the borehole wall. In one embodiment, the tool may include an extendable arm, radially protruding member and/or other mechanism that includes an acoustic transducer in contact with the borehole wall, and one or more additional transducers positioned at desired locations in the annulus. Such mechanism allows for, e.g., precise positioning of the transducer and/or caliper-like measurements. For example, measurements of the time of flight in the formation and/or borehole can be accurately measured.

FIGS. 4-7 illustrate embodiments of a transducer assembly 80 that includes a plurality of piezoelectric or other type of actuating elements 82 that are arranged in a circular or semi-circular array. The transducer assembly may be configured to be disposed in or with a measurement tool such as the tool 16 and/or the tool 40. For example, the transducer assembly 80 can be disposed in the tool 40 and configured to emit acoustic signals through the window 60.

The transducer elements or actuating elements 82 are arranged as a circular or semicircular array. Each element 82 or group of elements is individually controllable and can be pulsed separately, resulting in a phased array. The timing of pulsing for each element 82 (or group of elements) can be varied to electronically steer an ultrasonic or acoustic beam.

For example, pulsing the elements 82 successively along an array produces a pattern of constructive interference that results in a beam having a selected angle. Thus, the beam can be swept without requiring physical movement of the array in the direction of the sweep. Thus, these embodiments do not require rotation of a transducer as is performed in the embodiments of FIGS. 2 and 3.

Figure 7:
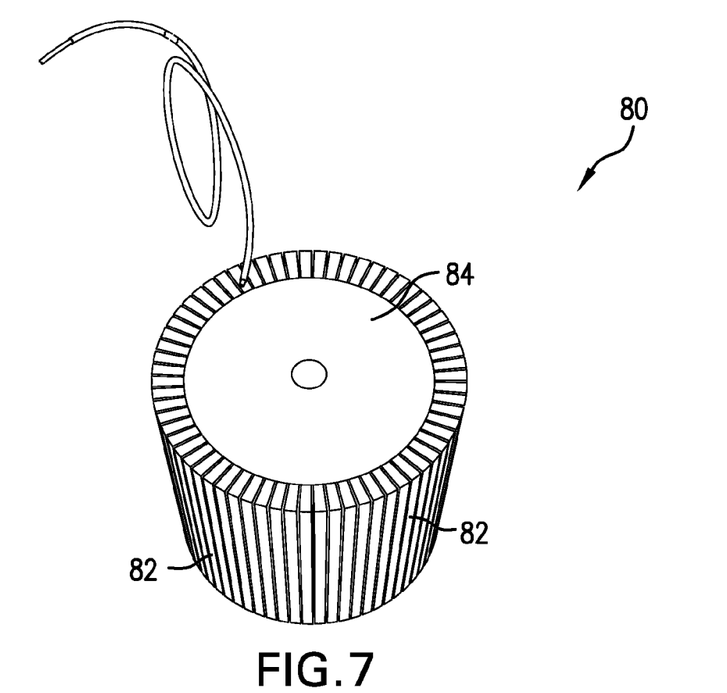
FIG. 7 depicts an embodiment of an acoustic transducer array including backing material.

Although the array is described as including a plurality of individual elements, it is not so limited. Instead of assembling individual elements into an array, a single element can be segmented to create individual actuating elements. For example, a disc or cylinder of piezoelectric material can be cut, grooved, diced or otherwise segmented to create the array from one or more of the chosen shapes. In addition, the actuating elements 82 can be segmented to create multiple actuating elements that can be individually actuated to allow for axial beam steering. An exemplary diced array is shown in FIG. 7.

In one embodiment, the array is included in a support structure that includes a backing material 84 in contact with the elements. The backing material 84 has a high acoustic impedance relative to other components or materials in the intended acoustic beam path, such as a lens, filling material, a window and borehole fluids. In the embodiments of FIGS. 4-7, the backing material 84 is disposed against the inside surface of the actuator element array, which is opposite the outside surface from which acoustic signals are to be emitted for measurement.

In one embodiment, the actuating elements 82 in the array are bars or other elongated structures which are elongated in an axial direction, e.g., along an axis of a downhole tool. The bars form a circular or semi-circular shape in a plane perpendicular to the axial direction. For example, the actuating elements 82 are oriented so that each element's longitudinal axis is at least substantially parallel to the longitudinal axis of the tool 16 and/or transducer module 46, although other orientations may be utilized. In the embodiments described herein, the array is an array of 64 to 128 piezoelectric elements, however the number of elements 82 is not so limited.

The array of elements or a portion of the array of elements can be configured as a phased array. For example, the array of FIGS. 4-7 can be divided into multiple array sectors such as an array sector 86, which may be a "n" element (e.g., 8 to 16 element) linear scanned phased array sector.

Figure 6:
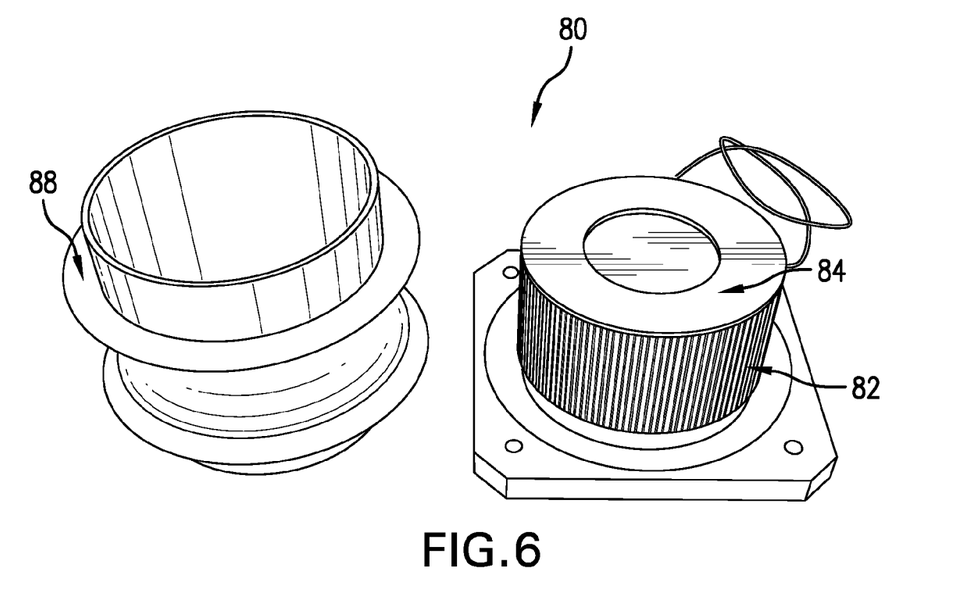
FIG. 6 depicts an embodiment of an acoustic transducer array including backing material.

A lens or other focusing element may be disposed in the path of acoustic beams emitted by the actuating elements 82. An exemplary lens 88 is shown in FIG. 6, which is a cylindrical lens configured to surround the array and focus acoustic beams emitted therefrom.

In one embodiment, the actuating (e.g., piezoelectric) elements 82, the backing material 84, the lens 88 and other components of the transducer assembly 80 are made from high temperature materials The high temperature materials, manufacturing techniques, acoustic coupling techniques and/or beam steering assemblies and methods described herein contribute to providing a transducer assembly that can effectively operate in high temperature and pressure environments, e.g., environments such as downhole and geothermal environments having temperatures up to about 300 degrees C. and 30,000 psi. In addition to temperature resistance, the transducer assembly utilizes a linear scanning phased array that eliminates the motor, gears and rotating coupling transformers used in traditional rotating acoustic imagers. In some embodiments, "high temperature" refers to temperatures found in an earth formation, e.g., in a borehole in a hydrocarbon formation or in a geothermal system. An exemplary high temperature is a temperature of at least about 260 degrees C.

Various piezoelectric materials may be used to form the actuating elements 82. Exemplary materials include high temperature piezoelectric materials, i.e., piezoelectric materials having a transition temperature or Curie temperature ($T_c$) at or above a selected temperature. In one embodiment, the selected temperature is a temperature found in subterranean or geothermal environments, e.g., up to 300 degrees C. Such materials include but are not limited to Bismuth Titanate, Lead Metaniobate, Lithium Niobate, Modified Lead Titanate and Lead Zirconate Titanate.

The backing material 84 can be made from various materials, material configurations and combinations to provide acoustic impedance at any temperature. The backing material may be configured to provide impedance at temperatures found in downhole environments, such as oil and gas boreholes (e.g., up to about 260 or 300 degrees C.) and/or geothermal environments. In one embodiment, the backing material is configured to provide for high temperature (e.g., greater than about 260 degrees C.) acoustic impedance. Exemplary materials include polymer materials having a high shear wave attenuation, such as polytetrafluoroethylene, silicone rubber, chlorosulfonated polyethylene and/or a combination of one or more other materials. An exemplary polymer is a moldable polymer compound such as XIAMETER® RTV-4136-M silicone rubber, which is a high durometer, medium tear resistance silicone moldmaking rubber. Other exemplary polymers include Pelseal Liquid Viton, DowCorning 3120 and 4136. It is noted that the backing material is not limited to the shapes and sizes described herein, as the backing material can take any suitable form or shape.

In one embodiment, the backing materials discussed above form a matrix or base in which additional materials are disposed, e.g., to increase impedance and/or attenuation. For example, aligned fibers can be disposed with the matrix material, such as by coating the fibers with matrix material and packing the fibers together or by embedding fibers in the matrix material. In one embodiment, the fibers are made from a material that has a compressional wave sound speed far greater than the matrix sound speed. Exemplary fibers include tungsten wires.

Embodiments of the backing material 84 are shown in FIGS. 6 and 7. The backing matrix includes an embedded granular material, e.g., material powder, particles or chips, that is distributed throughout the matrix material. The embedded material may be tungsten or any other material that increases absorption or attenuation of acoustic signals.

In one embodiment, the backing material 84 includes tungsten (or other suitable material) particles mixed or otherwise distributed throughout a polymer matrix. FIG. 6 shows a high temperature tungsten loaded backing 84 in contact with an array of fine grained high density piezoelectric elements 82. In this example, the array includes 64 pairs of elements 82. Each element 82 has a height of 50 mm, a width of 4.49 mm. The elements have a pitch or separation distance of 4.79 mm (1.5 times the resonant wavelength), a kerf depth of 0.3 mm and a radius of curvature of the array equal to about 50 mm.

Tungsten particles are typically in the form of relatively uniform small round beads available as a powder. The tungsten particles act to interrupt the sound path within the backing material, thereby increasing acoustic impedance.

In addition to a granular or powder material (e.g., tungsten powder), a plurality of randomly shaped chips may also be included in the matrix, which increase attenuation of acoustic waves by introducing non-structured, random absorption characteristics. In one embodiment, a combination of granular material and chips are embedded in the matrix to further enhance absorption.

For example, the backing material 84 shown in FIG. 7 includes a high temperature polymer matrix in which both tungsten powder and tungsten chips are embedded.

The mixture of powder and chips relative to the matrix material has effects on acoustic properties of the backing material. The absorption properties of backing materials with different relative amounts of powder and/or chips may be testing to determine an optimal mixture. For example, an optimal mixture of total tungsten solid to polymer ratio and powder to chip ratio can be determined based on estimations of absorption properties of a backing material having different weight percentages of tungsten powder and tungsten chips relative to a silastic RTV polymer base. Such mixtures exhibited an increased acoustic impedance and attenuation coefficient relative to other mixtures.

Backing materials that can be used in conjunction with acoustic transducers are not limited to the embodiments described herein. Any suitable backing material, matrix material, granular materials and combination thereof may be used for acoustic impedance. For example, porous materials such as fitted and/or voided metallic backing materials may be used. Other examples of backing materials that may be utilized in conjunction with transducers described herein include porous liquid-filled backings as described in U.S. Patent Application No. 2011/0222369 to DiFoggio et al. (published on Sep. 15, 2011), and sintered metal backings as described in U.S. Pat. No. 4,439,497 to DiFoggio (issued on Mar. 27, 1984), the descriptions of which are incorporated herein by reference in their entirety.

Figure 8:
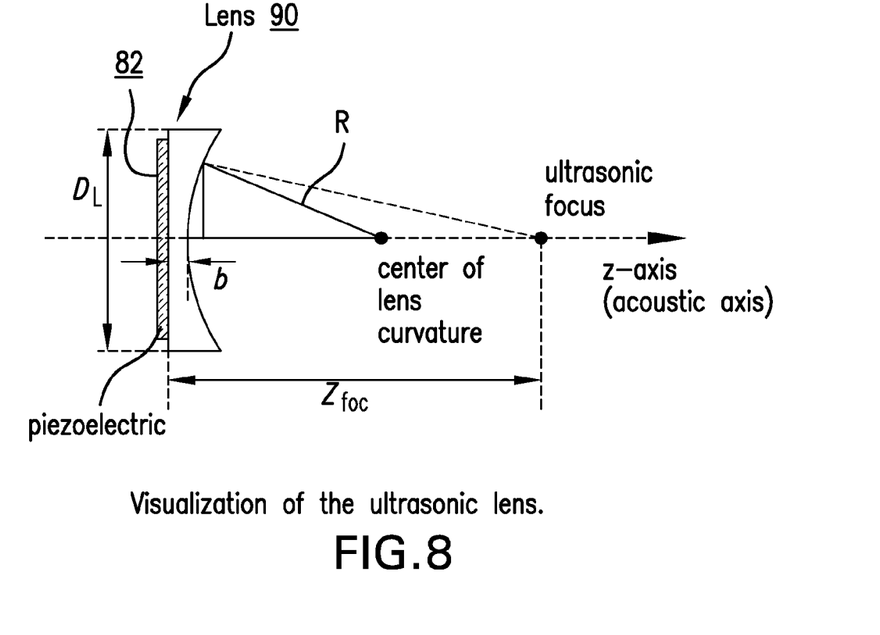
FIG. 8 depicts an exemplary lens for focusing an acoustic beam.
Figure 9:
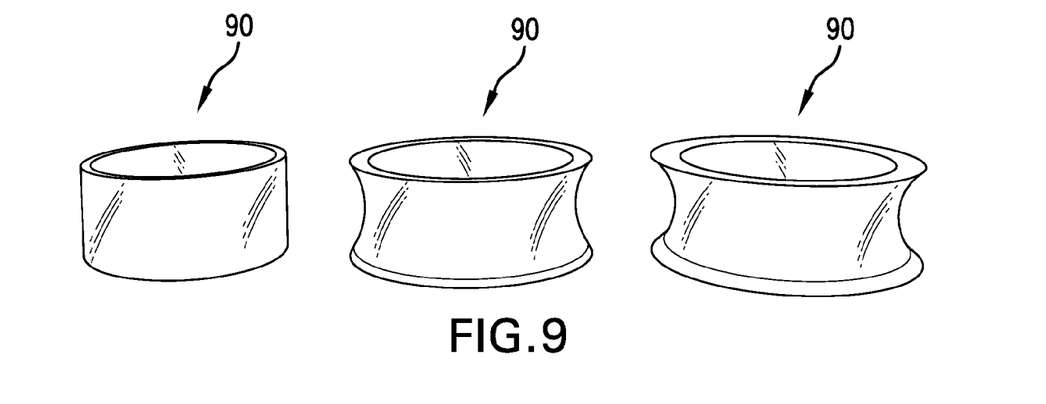
FIG. 9 depicts exemplary cylindrical lenses for focusing an acoustic beam emitted by an actuator element array.

FIGS. 8-9 show embodiments of a focusing element or lens that is coupled to the array to focus the acoustic beam, e.g., to maintain the beam at a selected axial level. This allows the array to electronically steer an acoustic beam and maintain the beam at a set level relative to a measurement tool. Various examples of a lens 90 are shown in FIGS. 8-9. FIG. 8 demonstrate how lens dimensions, including height, thickness and curvature affect the focal distance of an ultrasonic beam. FIG. 9 shows examples of a cylindrical lens made from a high temperature material that is configured to be coupled to the array and surround the elements 82. In one embodiment, an acoustic transducer assembly includes a circular, cylindrical or other lens that provides axial (e.g., vertical) focusing of the acoustic beam, in combination with a transducer array that can azimuthally focus the acoustic beam by, e.g., controllably actuating bars or other elements in a phased array.

An exemplary transducer assembly includes a cylindrical pressure compensated, optionally oil coupled, quarter-wave lens (e.g., lens 90) for elevation focusing. The lens 90 is disposed in front of a circular array such as the array including elements 82. The transducer using electronic beam steering (linear scanning) and focusing from the lens allows for azimuthal scanning of a focused and steered phased array.

Dimensional fit concerns are important to optimize the acoustic performance, e.g. quarter-wave matching distance from the transducer elements and the window separating the transducer (e.g., in oil) from the external wellbore environment. For example, referring again to FIGS. 3 and 4, the transducer assembly 80 includes matching layers 92 and 94 for coupling the elements 82 to a lens 90. If oil coupling is employed, a uniform, thin oil coupling/compensating layer 96 may be included between the matching layers 92 and 94.

Various support structures can be included in the transducer assembly, such as a center strength member that allows for through wiring (center circle), external support components and components that facilitate coupling the transducer assembly to a tool.

Various assembly, construction and operating techniques may be employed to facilitate implementation of a linear phased array in high temperature (e.g., greater than about 260 degrees C.) and high pressure (e.g. about 20,000 psi or greater) environments. Such techniques increase the performance and useful life of transducer assemblies, e.g., for wireline and LWD applications in downhole environments Methods to provide acoustic measurements in a high temperature borehole environments affect several performance conditions, which can be brought together to meet unique borehole environments. Such environments are different than that typically found in Non-Destructive testing and in Medical Imaging. Such methods include steps to construct the array configuration, provide back loading, focusing, and/or beam steering.

Embodiments of a manufacturing or assembly method include element (actuator/sensor) selection and matching procedures, placement and configuration procedures. For example, a manufacturing process includes analyzing a plurality of actuating elements (e.g., piezoelectric bars), and selecting a placement distribution of the elements that reduces or minimizes element variations to improve or optimize azimuthal uniformity and transmit/receive characteristics.

In one embodiment, elements are matched by selecting and distributing or disposing elements based on characteristics of each element, such as charge constant (d), mechanical constant (Q) and dielectric constant (Kt). Elements are matched and arranged based on these characteristics. For example, for each element, the series resonance frequency ($f_s$) is determined by increasing the cycling frequency from a frequency generator and estimating the frequency at which zero susceptance, minimum resistance and minimum impedance is found. The parallel resonance frequency ($f_p$) frequency is associated with zero reactance, maximum resistance and maximum impedance is found. Additional characteristics can be calculated based on the following equations:

$$k_{33} = \sqrt{\frac{\pi f_p}{2 f_s} \tan \frac{\pi}{2} \frac{(f_s - f_p)}{f_s}}$$

$$Q_m = \frac{f_p^2}{2 \cdot \pi \cdot f_s \cdot Z_s \cdot C \cdot (f_p^2 - f_s^2)}$$

$$C = \frac{KA \in_o}{t}$$

$$d_{33} = k_{33} \sqrt{8.85 \times 10^{-12} K_3^T S_{33}^E}$$

In this example, $k_{33}$ is the coupling factor and $d_{33}$ is the charge constant for a piezoelectric bar electrode on the ends and polarized along the length. $Z_s$ is the impedance magnitude at fs, C is the capacitance, K is the relative dielectric constant of the piezo material, $\in_o$ is the permittivity of free space, A and t are the element area and width respectively, and $Q_m$ is the mechanical quality factor.

In one embodiment, elements are placed based on the above characteristics, and similar elements or bars are configured to be actuated together as element pairs to maintain an aspect ratio that produces a dominant thickness mode and reduces spurious lateral modes. The element pairs may be attached and electrically connected as a single actuating element.

An exemplary method for selecting and matching piezoelectric bar elements (e.g., elements 82) is described as follows. This method is described as the following steps, although some steps could be excluded and/or the order of the steps modified:

1. Receive Piezoelectric elements, number individual elements and prepare for test data (e.g., set up directories for the test data).
2. Analyze each element by testing and characterizing each element. For example, each element is actuated at various frequencies and waveform signals are received, which may be examined and processed (e.g., remove double peaks and outliers).
3. The elements are sorted by characteristics (e.g., using a sorting program) and matching element pairs are selected. For example, elements having similar or equal frequency and amplitude relationships are numbered and packaged together.
4. Element pairs are coupled together, e.g., by adhering them together or otherwise disposing in fixed relationship. For example, matching elements that form a pair are attached by an epoxy or other adhesive, or by soldering the pairs.
5. Each pair is analyzed for characteristics such as those described above and pairs are selected for distribution in the array, e.g., airs with similar characteristics are selected for the array and or selected to be positioned proximate to one another.

An exemplary method for distributing and assembling transducer elements such as the piezoelectric bar elements 82 is described as follows. Each bar is cleaned and serialized (e.g., based on a analyzing characteristics of each bar). Bar pairs are adhered (e.g., by epoxy) and then loaded into a fixture device configured to hold the bars precisely in place during manufacture of the array, backing material and other components (e.g., wiring). Conductive epoxy is applied as tabs and pre-cured. The conductive epoxy is cleaned and shaved. A second coat of epoxy may be applied, pre-cured, cleaned and shaved. After inspection of the array, a longer cure is performed. After cure of each pair and conductive tabs, pair characteristics are measured and the pairs are sorted accordingly.

FIGS. 10-13 illustrate exemplary embodiments of methods for actuating acoustic transducers and emitting acoustic signals (e.g., ultrasonic signals) for acoustic measurement or imaging. The methods are effective for improving imaging effectiveness by reducing or minimizing undesirable modes and increasing signal-to-noise ratio.

The methods may be used in conjunction with any piezoelectric or other actuating elements used for acoustic imaging. For example, the method can be used with rotating transducers and transducers including elongated (e.g., bar shaped) elements and element arrays such as the circular and semicircular arrays described herein.

For elongated, bar shaped piezoelectric elements, the methods facilitate suppressing unwanted excitation modes and can also reduce sound coupling between adjacent bars or other elements.

The methods are effective for arrays of long bar shaped piezo elements. If the same piezo element is used for transmission as well as for reception, the high voltage ring down completely hides away the lower amplitude echo. The high voltage ring down has two parts: a) residual high voltage energy from the resonant mode excitation, and b) residual length mode excitation. Both of these parts could be reduced by return to zero (RTZ) implementation, pulse shaping and by appropriate matching networks as described herein. Such RTZ circuits and matching networks can achieve more than 30 dB improvements in signal to noise ratio compared to impulse pulsers. Pulse shaping is also effective in achieving reductions in length mode energy. Other pulse shaping techniques can be used. For example, pulses that include intermediate steps (instead of or in addition to maximum, minimum and zero values) may be used.

Figure 10:
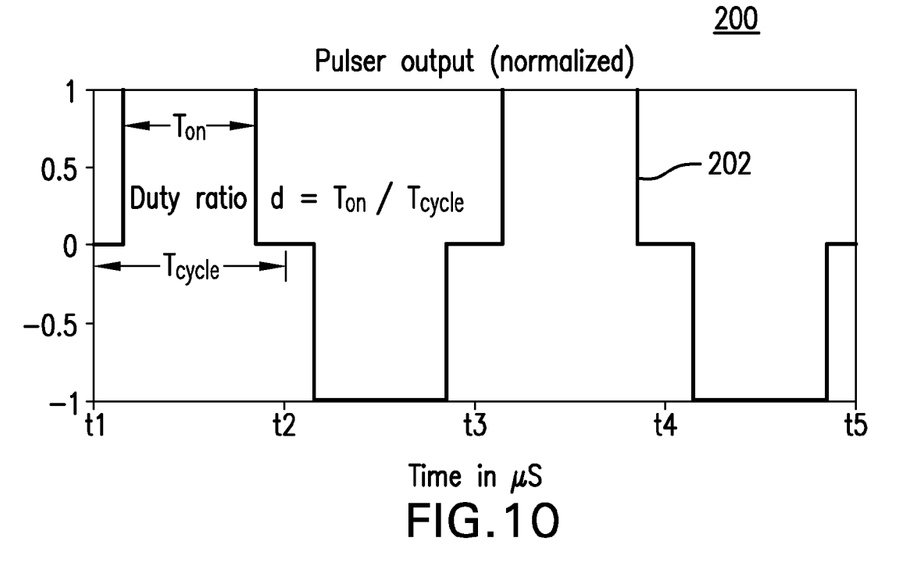
FIG. 10 depicts a waveform representing an acoustic pulsing method.
Figure 11:
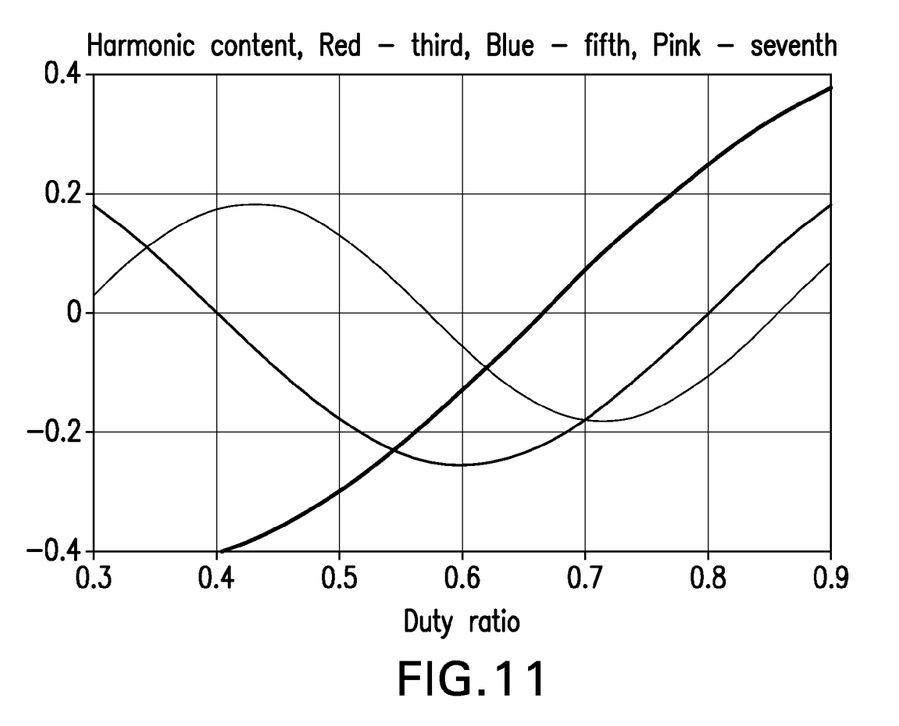
FIG. 11 is a chart showing harmonic content in relation to a duty ratio used in the method of FIG. 10.

A first method, embodiments of which are described in conjunction with FIGS. 10 and 11, includes pulse duty ratio selection to improve signal-to-noise ratios and reduce length modes. A second method, embodiments of which are described in conjunction with FIGS. 12 and 13, includes utilizing RTZ pulsing in combination with inductance matching. The first and second methods may be employed separately or in combination to improve signal-to-noise ratios and reduce unwanted modes. These methods and associated circuits can be used with various types of actuators. For example, these methods and circuits may be used to actuate the elements of the circular and semicircular arrays described above and allow for a more uniform acoustic beam focused closer to the elements than other actuator assemblies.

FIG. 10 shows a normalized pulser output 200 that includes a waveform 202 representing bipolar excitation of a bar-shaped piezoelectric actuating element. This illustrates a return to zero (RTZ) pulsing scheme that utilizes pulse-width modulation having a selected duty cycle. The duty cycle is controlled or adjusted to reduce or minimize the length mode generated by the element, which can hide pulse echo signals. For example, the bar-shaped element is analyzed to determine a desired or optimal frequency, and the duty cycle (e.g., t1, t2, t3 . . . ) is set to correspond to that frequency.

The pulse duty is controlled to generate a waveform that is close to a perfect sign wave, which reduces or minimizes energy transfer to the length mode. The waveform can approximate a sine wave by this method without using a complete PWM technique. The duty ratio as show below is the ratio of the time the pulser is high ($T_{on}$) to the total cycle time ($T_{cycle}$). This ratio could be used to reduce the harmonics and hence produce a waveform close a sine wave.

A simple Fourier series analysis would give the harmonic content in the above waveform. From symmetry this waveform will have only odd harmonics of the sine terms and it would suffice to investigate the third, fifth and seventh harmonic components. These harmonics are plotted in FIG. 11. The higher harmonics will be efficiently filtered by the matching impedance and by the parasitic capacitance and inductances.

Driving the square wave pulser in this optimum duty ratio results in close to sine wave excitation and elimination of length mode.

Figure 12:
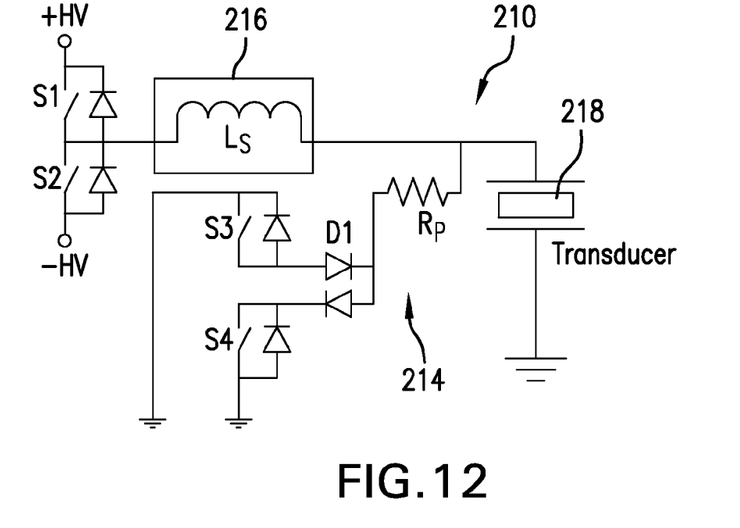
FIG. 12 depicts a circuit for actuating an acoustic transducer.

FIG. 12 shows an exemplary circuit 210 that includes an RTZ circuit 212 and also includes a series resistance 214 and an induction matching network 216 connected to a piezoelectric actuator 218. This circuit is used to generate pulse signals that can suppress unwanted modes (e.g., length mode) and improve ring down while driving transducer elements.

The length mode generated by a long bar of piezo element completely hides the echo. With the latest generation of pulser circuits that provide complete control of the wave shape, bipolar excitation and active return to zero (RTZ) it is possible to control this length mode. Earlier generation of ultrasound pullers provide an impulse and remain open circuit after the impulse interval passes. This does not provide any low impedance path for the piezo energy to dissipate. In the latest generation of pulser circuits the piezo is given a low impedance path to ground whenever the pulser is not connected to high voltage. The circuit providing this low impedance state is often called return to zero (RTZ) circuit.

It was found that an RTZ circuit including a series resistance and inductance matching network can be used to reduce the length mode. FIG. 12 provides a typical circuit diagram where the resistance is lumped into the parasitic resistance of the inductor $L_s$. This can improve the ring down during the signal reception by, e.g., about 30 db.

Figure 13:
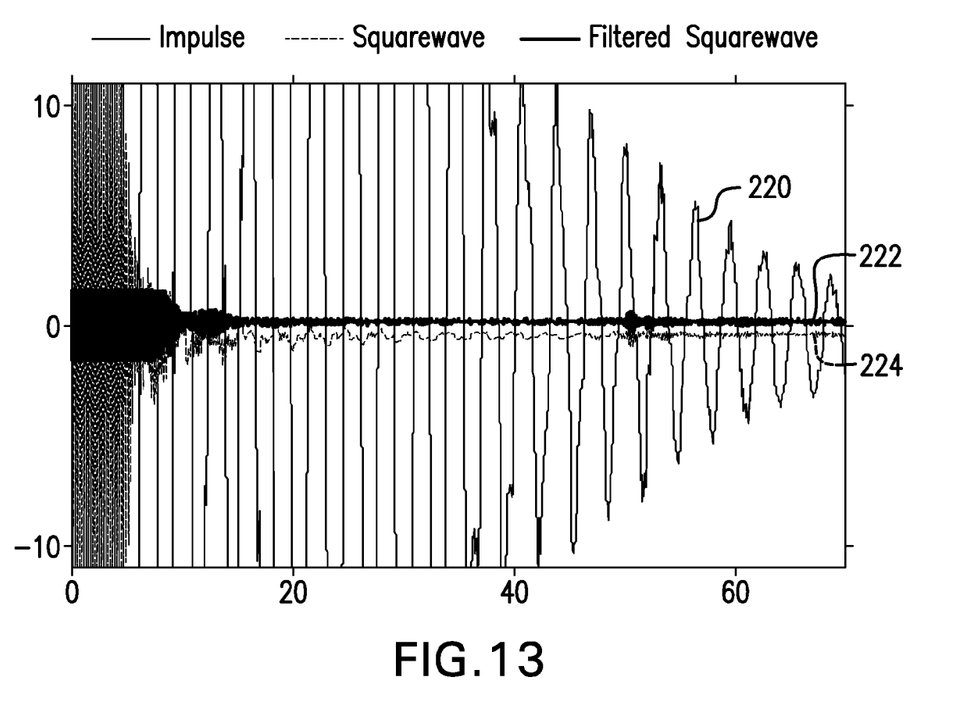
FIG. 13 shows exemplary acoustic signals.

An optimization method using this circuit reduces both the ringdown as well as the length mode and gives much superior signal to noise ratio than a simple use of commercially available integrated circuits. The optimization method provides the value of matching inductance and resistance. FIG. 13 shows the improvements in signal to noise ratio. In plot 220, the echo is lost in the length mode ring down. The plots 222 and 224 illustrate the improvements. Another optimization method uses high-pass filter or preferably a band-pass filter on the received signals to eliminate the low-frequency length mode ring-down and the high-frequency noises.

A method for imaging a borehole and/or formation includes one or more of the following stages. The method is described herein in conjunction with a processor (e.g., the processing unit 20), but is not so limited, and can be performed in conjunction with any number of processing devices. In one embodiment, the stages are performed in the order described, although some steps may be performed in a different order or one or more steps may be omitted.

In a first stage, an imaging tool such as the tool 16 and/or 40 is disposed in a borehole in an earth formation.

In a second stage, when the tool is deployed at or near an area of interest, a transducer assembly, such as a circular or semi-circular array is activated to produce a focused acoustic beam at a substantially constant axial level relative to the tool. The beam may be electronically steered by varying the timing of element pulses. In one embodiment, actuation and beam scanning is performed automatically as the tool is lowered in a borehole (e.g., by lowering a wireline, drilling or tripping out a borehole string).

An axis is selected for initially directing the beam, e.g., a radial axis perpendicular from the tool axis. When the initial axis is selected, rotation is simulated by beam steering. For example, delay pulsing is used by pulsing a first group of elements in the array, and then pulsing a second adjacent group in the direction of steering. This delayed pulsing in conjunction with focusing features described herein provides for a radially focused beam that is rotated while maintaining an axial level relative to the tool.

In one example, for each group of elements, the beam is focused by selecting the outermost pairs in the group, actuating the outermost pairs for a selected time, and subsequently selected adjacent inner pairs and actuating the inner pairs for a shorter time. This is repeated for successive pairs until the innermost pair is actuated at the center of the group. The innermost pair is actuated for the shortest time period.

The tool is advanced through a borehole as the beam is electronically steered. Each rotation of the beam produced an image line, which are combined to produce an acoustic image.

In the third stage, the acoustic image is analyzed to estimate characteristics of a borehole, casing or formation. For example, the acoustic image is analyzed to identify fractures and estimate fracture characteristics.

The embodiments described herein provide numerous advantages. For example, various features and embodiments described herein are utilized to improve the performance of an acoustic measurement tool and/or reduce degradation due to, e.g., high temperatures experienced downhole. In addition, the transducer assembly described herein can be used at various temperatures and temperature ranges, and the linear array can be adjusted for specific temperatures.

Generally, some of the teachings herein are reduced to an algorithm that is stored on machine-readable media. The algorithm is implemented by a computer or processor such as the processing unit 20 and/or electronics unit 32 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An acoustic transducer assembly comprising:
  a carrier configured to be disposed in an earth formation, the carrier having a carrier axis;

an array of individual transducer elements forming at least a semicircular shape, each individual transducer element configured to be actuated by an electrical signal to emit an acoustic signal, the array configured to emit acoustic signals in a radial direction relative to the carrier axis, the array including matched pairs of individual transducer elements, said each pair of individual transducer elements having a similar characteristic, said each pair of individual transducer elements configured to be actuated together as a single transducer element; and a circuit coupled to the array and configured to actuate a subset of the transducer elements and emit an acoustic beam therefrom, the subset including the plurality of matched pairs of individual transducer elements, the circuit configured to actuate the subset as a phased array to electronically rotate the acoustic beam about the carrier axis, the circuit configured to successively actuate said each pair of individual transducer elements to focus the acoustic beam.

2. The assembly of claim 1, further comprising a focusing element configured to focus the acoustic beam along an axial direction.

3. The assembly of claim 1, wherein the individual transducer elements are piezoelectric elements, and the individual transducer elements in said each pair of individual transducer elements have a similar piezoelectric material characteristic.

4. The assembly of claim 1, wherein the array is configured to emit the acoustic beam in a downhole environment having a temperature that is greater than about 260 degrees C. and up to about 300 degrees C.

5. The assembly of claim 1, further comprising a cylindrical lens coupled to the array and configured to focus the acoustic beam to maintain the acoustic beam at a selected level along an axial direction, the axial direction perpendicular to the radial direction.

6. The assembly of claim 1, further comprising a backing material disposed relative to the array and configured to impede the acoustic signals.

7. The assembly of claim 6, wherein the backing material includes an acoustically impeding material forming a matrix, and a granular material embedded in the matrix and configured to increase absorption or attenuation of the acoustic signals.

8. The assembly of claim 7, wherein the backing material includes a plurality of randomly shaped chips embedded in the matrix.

9. The assembly of claim 1, wherein the circuit is configured to actuate one or more transducer elements by applying a pulsed signal, the pulsed signal being generated using pulse-width modulation and having a duty cycle selected based on harmonic content produced by the transducer.

10. The assembly of claim 9, wherein the pulsed signal forms a return to zero (RTZ) pulse waveform.

11. A method of imaging at least one of a borehole and an earth formation, the method comprising:

deploying a carrier in a borehole in an earth formation, the carrier having a carrier axis, the carrier including an array of individual transducer elements forming at least a semicircular shape, each individual transducer element configured to be actuated by an electrical signal to emit an acoustic signal, the array configured to emit acoustic signals in a radial direction relative to the carrier axis, the array including matched pairs of individual transducer elements, said each pair of individual transducer elements having a similar characteristic, said each pair of individual transducer elements configured to be actuated together as a single transducer element;

actuating a subset of the transducer elements by a circuit coupled to the array and emitting an acoustic beam therefrom, the subset including the matched pairs of individual transducer elements, wherein said each pair of individual transducer elements is actuated as a single transducer element, the subset actuated as a phased array to electronically rotate the acoustic beam about the carrier axis, wherein actuating includes successively actuating said each pair of individual transducer elements to focus the acoustic beam;

detecting acoustic signals from at least one of the borehole and the earth formation by an acoustic receiver; and estimating characteristics of at least one of the borehole and the earth formation based on the detected signals.

12. The method of claim 11, further comprising focusing the acoustic beam to a substantially constant axial location relative to the carrier.

13. The method of claim 11, wherein actuating includes directing the beam to a first radial location by pulsing a first group of transducer elements, and steering the beam toward a second radial location by subsequently pulsing a second group of transducer elements, the second group of transducer elements located closer to the second radial location.

14. The method of claim 11, wherein actuating includes focusing the acoustic beam to a radial location by actuating an outermost pair of individual transducer elements, and thereafter successively actuating one or more pairs of individual transducer elements located between the outermost pair.

15. The method of claim 11, further comprising extending the array to a location selected from at least one of an annular location in the borehole and a location in contact with a borehole wall.

16. The method of claim 11, wherein the carrier further includes a backing material disposed relative to the array and configured to impede the acoustic signals.

17. The method of claim 16, wherein the backing material includes an acoustically impeding material forming a matrix, and a granular material embedded in the matrix and configured to increase absorption or attenuation of the acoustic signals.

18. The method of claim 17, wherein the backing material includes a plurality of randomly shaped chips embedded in the matrix.

19. A method of generating an acoustic signal from an acoustic transducer, comprising:

deploying a carrier in a borehole in an earth formation, the carrier having a carrier axis, the carrier including an array of individual transducer elements forming at least a semicircular shape, each individual transducer element configured to be actuated by an electrical signal to emit an acoustic signal, the array configured to emit acoustic signals in a radial direction relative to the carrier axis, the array including the matched pairs of individual transducer elements, each pair of individual transducer elements having a similar characteristic, said each pair of individual transducer elements configured to be actuated together as a single transducer element;

actuating a subset of the array of transducer elements by applying a pulsed signal to emit an acoustic beam, the pulsed signal being generated using pulse-width modulation and having a duty cycle selected based on harmonic content produced by the transducer elements, the subset including the matched pairs of individual transducer elements, wherein said each pair of individual transducer elements is actuated as a single transducer element, wherein actuating is performed by a circuit coupled to the array, the subset actuated as a phased array to electronically rotate the acoustic beam about the carrier axis, wherein actuating includes successively actuating said each pair of individual transducer elements to focus the acoustic beam;

detecting acoustic signals from at least one of the borehole and the earth formation by an acoustic receiver; and estimating characteristics of at least one of the borehole and the earth formation based on the detected signals.

20. The method of claim 19, wherein the pulsed signal forms a return to zero (RTZ) pulse waveform.

\* \* \* \* \*